Figure 1:
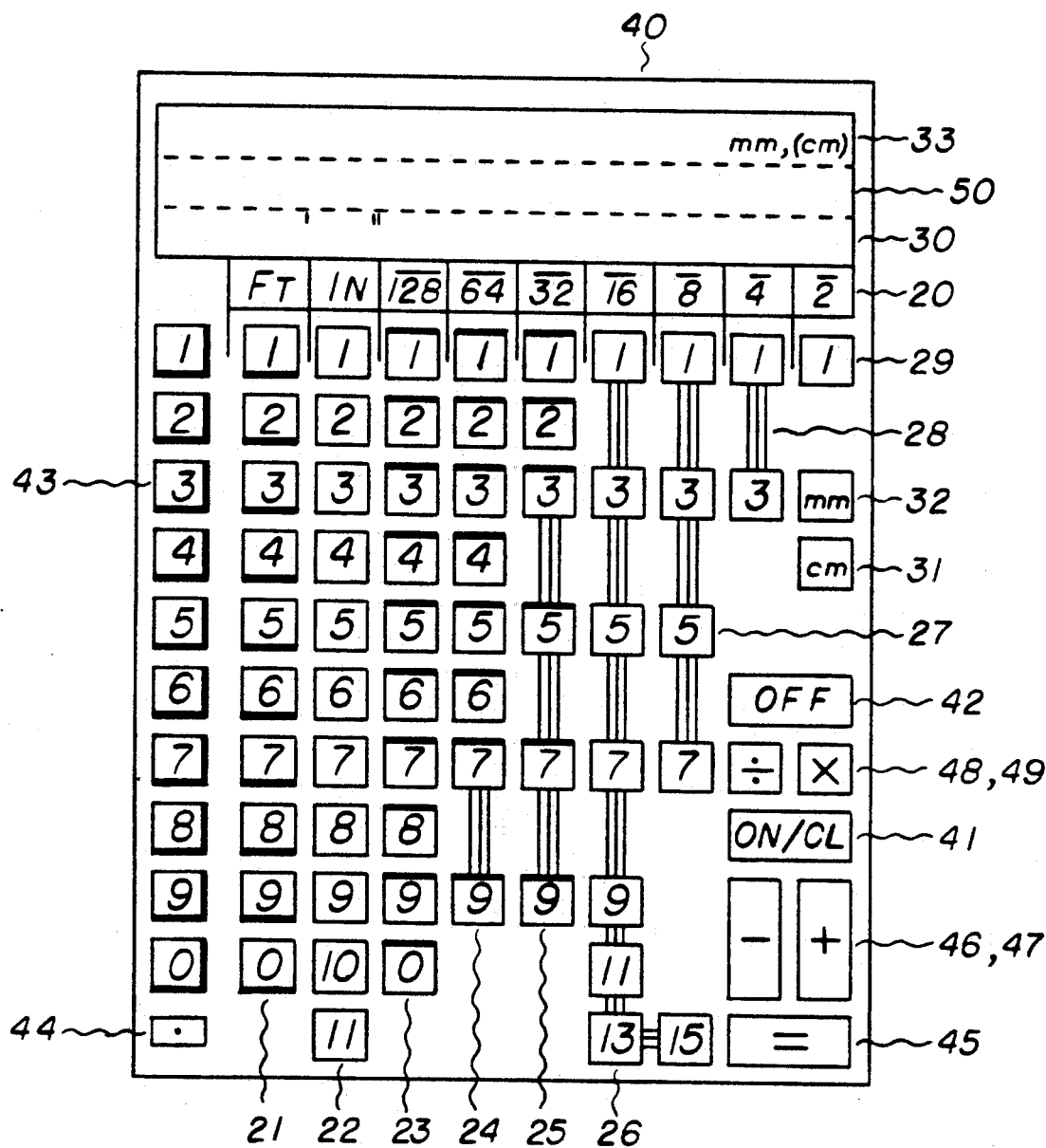

United States Patent [19]
Meta et al.

[11] Patent Number: 5,272,653
[45] Date of Patent: Dec. 21, 1993

[54] MULTILANE KEYBOARD FOR INCH CALCULATORS

[76] Inventors: Virgil Meta, 337 N. Isabel St. Ap.#1, Glendale, Calif. 91206; Dragosh Negrea, 412 Partridge Dr., Albany, Ga. 31707

[21] Appl. No.: 959,966

[22] Filed: Oct. 13, 1992

[51] Int. Cl.⁵ .............................................. G06F 3/00
[52] U.S. Cl. ........................ 364/709.12; 364/709.07; 364/715.05
[58] Field of Search ...................... 364/709.12, 709.07, 364/709.02, 715.05

[56] References Cited

U.S. PATENT DOCUMENTS

| | | | |
|---|---|---|---|
| D. 303,540 | 9/1989 | Lewis | D18/7 |
| 4,081,859 | 3/1978 | Goldsamt et al. | 364/709.07 |
| 4,100,603 | 7/1978 | Boyd | 364/709.07 X |
| 4,463,438 | 7/1984 | Zatezalo et al. | 364/709.07 X |
| 4,488,250 | 12/1984 | Lipsey et al. | 364/709.07 |
| 4,545,022 | 10/1985 | Hughins | 364/709.07 |
| 4,744,044 | 5/1988 | Stover et al. | 364/709.02 X |
| 4,872,112 | 10/1989 | Hungerford | 364/709.07 X |
| 5,138,566 | 8/1992 | Comforti | 364/709.07 |

Primary Examiner—Tan V. Mai

[57] ABSTRACT

The main difficulty in working with the U.S. length units is in adding or subtracting dimensions and especially when converting them into metric, both in making and in using drawings for general construction and machine technology. These are the problems and the areas Multilane is intended for as an inch keyboard to be incorporated in any functionally adaptable calculator. The resulted professional tool is proposed for convenience in two embodiments: the Nine-Lane with nine built-in units from 1 Ft to 1/128" range and the Six-Lane with six built-in units from 1 Ft to 1/16" range. Taking advantage of their invariability, the units are removed from the keys and written in permanent characters on calculator housing. The result: no keys and no keystrokes for units and consequently Multilane makes use of only 40% of the number of keystrokes required by a conventional inch keyboard for the same entries. The most valuable contribution of this invention is expected in the large amount of conversions for the transition to the metric system by the use of its dual inch-metric system of display.

1 Claim, 2 Drawing Sheets

MULTILANE KEYBOARD FOR INCH CALCULATORS

BACKGROUND OF THE INVENTION

1. Field of the Invention This invention relates generally to inch calculators, having as its particular object an improved inch keyboard designed to work in sequence with any functionally adaptable inch calculator.

2. Technical Considerations and Prior Art The input data for inch calculators consist of measure numbers and measuring units, standing for the linear dimensions of technical drawings.

In fact, the dimension is a juxtaposition of three portions, measured in the distinct species of the units they include, and termed here sub-dimensions:
Number of Feet,
Number of Inches, and
Number of Equal Parts of an Inch Fraction.

Because each sub-dimension is:

(a measure number)×(a measuring unit), it results, without exception, that the inch calculators must perform the handling of six distinct data per handled dimension:

(3 numeric data)+(3 unit species)

and the only in which the inch calculators can compete for performance is in the ways they deal with the species of units.

The performance of inch calculators is directly conditioned by their keyboards and may be compared by the number of keystrokes KS each one requires for the entry of the same dimension. For example, of:

2 Ft−10 In−13/16.

where 2, 10 and 13 are the measure numbers of the subdimensions 2 ft, 10 In and 13/16. To evaluate the level of the prior art, we will use this example and the KS criterion to compare a number of known inch calculators:

1978, Goldsamt et al. U.S. Pat. No. 4,081,859.
  Lacking the sixteenths. Not comparable.
1978, Boyd, U.S. Pat. No. 4,100,603.
  Having only the 1/16" as fraction. Not comparable.
1984, Lipsey et al. U.S. Pat. No. 4,488,250
  [2],[Ft],[1],[0],[In],[1],[3],[x/16].

8 KS

1985, Hughins, U.S. Pat. No. 4,545,022.
  [2],[Ft],[1],[0],[AND],[1],[3],[1/16].

8 KS

1988, Stover et al. U.S. Pat. No. 4,744,044.
  [2],[Ft],[1],[0],[IN],[1],[3],[/],[1],[6].

10 KS

1992, Comforti, U.S. Pat. No. 5,138,566.
  Lacking the Feet. Not comparable.
Prod. #3170 Calculated Industries, Pocket Handyman II
  [2],[Ft],[1],[0],[IN],[1],[3],[/],[1],[6].

10 KS

In fact, the KS criterion determines the limitation of the number of built-in units in calculators, and may create a barrier to their market introduction.

OBJECTS AND ADVANTAGES

Multilane disregards as invariants the units, that are handled indirectly by the selection of the unitary designated lanes. Therefore, the user has to depress keys only for
3 measure numbers,
per dimension. The result is a keyboard with the maximum performance obtainable.

The operation of the Multilane with respect the above example gives a better performance than the prior art:
[2][10][13].

3 KS

An outstanding advantage of the Multilane is that it exceeds the required dimensional ranges for designing, general construction and machine technology with its two embodiments:
The Nine-Lane, for 1 Ft to 1/128" range of units, and
The Six-Lane, for 1 Ft to 1/16" range.

Another advantage would be from the dual inch/metric dimensioning of drawings, thus making them directly utilizable before, during and after the legal introduction of the metric system.

All keys of Multilane for inches and fractions of inch are one-stroke keys, requiring one stroke per subdimension, that is one stroke for each: 10", 11/16", $\frac{3}{4}$", $\frac{1}{8}$", etc.

DRAWING FIGURES

The Multilane is presented in two top views of distinct embodiments:
FIG. 1: a Nine-Lane Keyboard
FIG. 2: a Six-Lane Keyboard.

REFERENCE NUMERALS IN DRAWINGS AND DESCRIPTION

1. The Nine-Lane Keyboard FIG. 1
40 Top of Incorporating Calculator Housing, provided with a blank space 20 on the calculator housing 40 to be filled in with the labeling for unit denominators.
20 Line of Unit Denominators:
Ft, In, /128, /64, /32, /16, /8, /4, /2,
imprinted in permanent characters on the housing 40, with the fractions in inverse order to leave room for the function keys, and serving to:
Mark out by name each underlying lane by its designated unit,
Participate, as denominators in conjunction with the measure numbers displayed on 30, in the reading of the complete expression of the input dimensions, as for ex.: 3 Ft-7 In-103/128", etc.
Remind that the constants K for converting into metric units are calculated for each unit in function of its value with respect 1 In=2.54 cm and permanently stored in the memory of the calculator circuitry. From there, they are singled out as matching factors for the measure numbers coming in as keyed impulses, multiplied and sent together in circuitry as metric equivalents.
21 Lane of Feet Numbers, incorporating ten one-digit keys used to press entries of Feet numbers of 1, 2 or more digits.

22 Lane of Inch Numbers, consisting of eleven one-stroke keys used to enter the assigned numbers marked on them.

23 Lane of 1/128-ths", made up of ten one-digit keys to be used for any one of the whole set of the 64 odd numbers 1,3, ... 125,127 that express the numerators for the 1/128-ths" fractions.

24 Lane of 1/64-ths", consisting of eight one-digit keys 1,2,3,4,5,7,9 to be used to activate any one of the whole set of 32 odd numbers 1,3, ... 61,63 that express the numerators for the 1/64-ths" fractions.

25 Lane of 1/32-nds", implicating six one-digit keys 1,2,3,5,7,9 to be used for the entry of any one of the whole set of the 16 odd numbers 1,3, ... 29, 31 that express the numerators for the 1/32-nds" fractions.

26,27 Lanes of 1/16-ths", ⅛-ths", ¼-ths", ½", 28,29 for entries of odd numerators by assigned keys, similar in use with the inch lane.

31,32 Switch Keys for choosing between converting in millimeters or centimeters.

The Display Screens

30 Display Screen Window for entries and calculation results expressed in Number of Feet, Number of Inches, Number of Fractionary Inch Parts.

33 Display Screen Window for converted measures either in millimeters or, if switched, in centimeters with two decimals, as duplicate of each inch entry and of each inch result displayed on 30. The user may round the readings to their nearest integer, or to the balance of the sum of any individual chain of dimensions.

50 Display Screen Window for dimensionless numbers, working particularly for the arithmetic calculator.

Arithmetic Calculator and Functional Keys 43,44 Numeric-and Decimal Point-Keys for an extra, conventional arithmetic calculator.

41,42 Conventional Functional Keys: "ON/CL", "OFF".

45 Conventional Key for Equality.

46,47 Conventional Arithmetic Keys for addition and subtraction.

48,49 Conventional Arithmetic Keys for multiplication and division.

2. The Six-Lane Keyboard FIG. 2

The Six-Lane Keyboard is obtained from the Nine-Lane by the elimination of the following parts:

23,34,25, that is the /128, /64 and /32 lanes.

3. The Six-Inch Lane Keyboard

Figure 2:
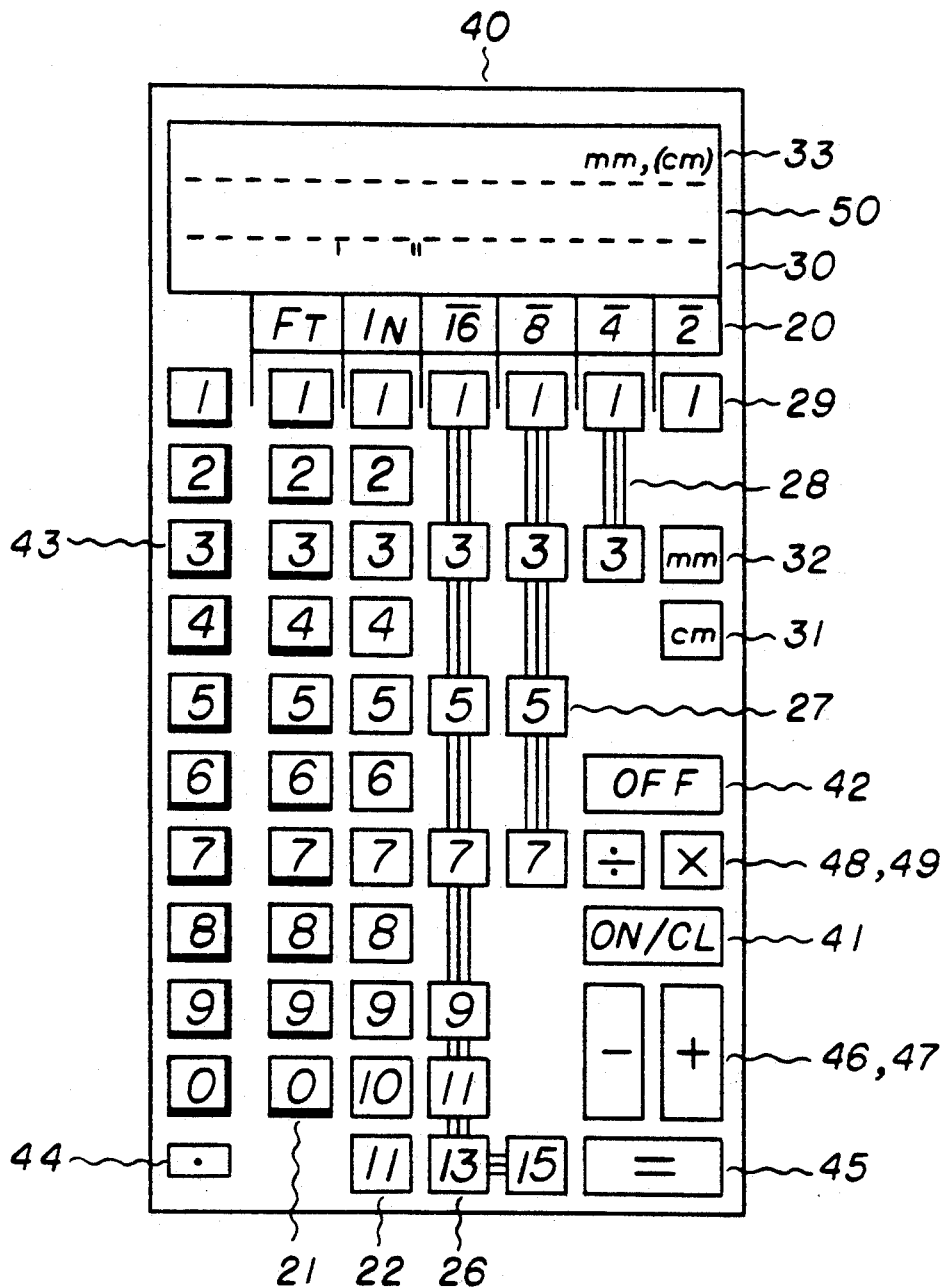

Intended for the most specific routine, it is obtained from Six-Lane Keyboard FIG. 2 by the elimination of the parts: 43, 44, 48, 49, 31, 32, 50 Arithmetic Calculator, Division and Multiplication Keys, Switch Keys and Screen Window for dimensionless numbers.

SUMMARY

The Multilane Keyboard is incorporated and works in sequence with a calculator.

The part claimed by this invention consists of:

The systematization in lanes of keys for measure numbers, each lane being assigned for a single U.S. unit and used exclusively for the entry of measure numbers related to that unit. There is no handling of the units. They come as concealed designating parts with each lane and each measure number, Dual inch-metric display on screens 30 and 33 for every entry and every result, Achieving of metric conversions by acting upon their measure number part as displayed on 30, instead of upon the expressions of whole dimensions, Achieving arithmetic computations by acting upon their metric equivalents as displayed on 50, and conversion back to inch, instead of upon the expression of whole inch dimensions.

The incorporating calculator is assumed conventionally adaptable and used by means for the following particular functions, typical for arithmetic and scientific calculators:

Display on screen 30 of any measure number at the same unitary position as the unit of the Lane it was keyed, Permanent storage in memory of the constants K of the conversion in metric of U.S. units: $K_{71}=30.48$, $K_1=2.54$, $K_2=1,27$, ... $K_{128}=0.1984375$ cm, as well as their values in mm.

Activation of the matching constant K from memory, by the coming in impulse from any keyed measure number, their multiplication and display of the result on 33.

Arithmetic computations upon metric values of dimensions displayed on 33 and the dual display of the result, in metric on 33 and converted inch on 30.

The arithmetric calculator and the arithmetic keys shown in FIG. 1 & 2 are auxiliary conventional parts.

OPERATION

The Multilane Keyboard operates in sequence with an incorporating inch calculator. Because the inch functions performed by the calculator are of typical nature, the present operation will refer only to the All lanes are made of one-stroke keys, except the Foot, /128, /64, and /32.

The entry of any dimension is operated by entering successively its component unitary measures. To enter for example: 13 Ft-11 In-25/128:

1. Select the Ft Lane and press 1 and 3,
2. Select the In Lane and press 11,
3. Select the /128 Lane and press 2 and 5,
4. Check on lines 20 and 30 the display of:

13 Ft—11 In—25/128.

Taking into account that its handling is among the most simple, the operation of the Multilane will be adequately illustrated by a few typical keystroke sequences:

| Dimension | KS Sequences | KS | Nominal *KS |
|---|---|---|---|
| 8'-10"-15/16, | [8], [10], [15], | 3 KS, | (10 KS) |
| 10'-11"-⅛, | [1], [0], [11], [7], | 4 KS, | ( 9 KS) |
| 12'-9"-⅛, | [1], [2], [9], [7], | 4 KS, | ( 8 KS) |
| 2'-3"-125/128, | [2], [3], [1], [2], [5] | 5 KS, | (11 KS) |
| 4'-1"-19/32, | [4], [1], [1], [9], | 4 KS, | ( 9 KS) |

Nominal *KS means the KS of a conventional inch keyboard for the input of the same dimension.

For additions, subtractions and conversion into metric of dimensions or their multiplication and divisions with dimensionless numbers, the operations are subjected to the conventional rules.

Because there is a keylane for each built-in measuring unit, it results in a relatively large number of keys. For easier identification, the keys should be contrasted and coded by shape and color.

In essence, this invention is an aggregate of individual lanes of keys, each one assigned for a certain unit species, being used for the input of any measure number of that species. When such a number is keyed, the activated impulse joins the species unit constant of measure conversion, singled out from calculator memory, and, after being multiplied together, they become the metric equivalent progressing thereafter according to the typical ways of calculators. This essentiality consists of a new and more productive arrangement of the conventional keys and of the standard units use.

Multilane requires KS uniquely for the measure numbers, that is only for about 40% of those necessitated by a conventional inch keyboard.

It will be understood that diverse omissions, additions of extra functions, or changes in forms, details and operation may be made by those skilled in the art without departing from the essence of the invention.

CONCLUSION

The particularities of Multilane:

1. It deals directly only with the measure numbers (f, i, n) of any dimension (f.Ft−i.In−n/x), where x is the denominator of any inch fraction.

2. Each lane is designated to a single unit species.

3. The unit (Ft, In or /x) of each measure number is specified by the lane used for its entry.

4. Any keyed measure number is displayed on screen 30 and can be read as the whole sub-dimension in conjunction with the facing denomination from line 20.

5. All conversions into metric start from measure numbers.

6. Multilane displays dually in U.S. and metric units any input and every output. This is the basis for conversion into metric in both usual and dual dimensioned drawings.

7. Dimension in U.S. units enter and are processed in calculator only as measure numbers. Their metric equivalents are processed on values of whole dimensions.

8. The additions and subtractions are operated upon metric equivalents and the results converted back to U.S. units.

9. The multiplications and divisions of dimensions with dimensionless numbers are operated upon measure numbers.

What we claim is:

1. An inch keyboard designed to handle only the measure numbers with steady dual inch-metric display, disregarding the units as invariants, thus being exclusively assigned and used for the entries, conversions of and calculations upon the measure numbers and comprising:

a) a number of key lanes equal with the number of built-in unit species, each lane being assigned to a single unit for which it is provided with the kind and number of keys necessary and sufficient to key for the entry of all the measure numbers related to the unit the lane is assigned, b) a labeling in permanent characters on the calculator housing of the denominations of the built-in units in a position to designate the unitary measures of lanes and on the other hand to face as unitary counterparts the displays of the measure numbers, thus giving conjointly the visual synthesis of each entered sub-dimension, c) means for the conversion in metric system of each entry and of each result with their displays as dual input and dual output data, and d) means to use the metric equivalents for arithmetic operations upon dimensions with results in dual metric and converted inch displays.

* * * * *